March 10, 1959     H. B. KIRK ET AL     2,876,806
BEVERAGE DISPENSING MACHINE
Filed July 14, 1955     5 Sheets-Sheet 1

INVENTORS
HOWARD B. KIRK &
CHARLES F. ANSPACH
BY
ATTORNEYS.

INVENTORS
HOWARD B. KIRK &
CHARLES F. ANSPACH
BY
Barnes, Kisselle, Laughlin & Raisch
ATTORNEYS.

March 10, 1959

H. B. KIRK ET AL 2,876,806

BEVERAGE DISPENSING MACHINE

Filed July 14, 1955

INVENTORS
HOWARD B. KIRK &
CHARLES F. ANSPACH
BY
Barnes, Kisselle, Laughlin & Raisch
ATTORNEYS.

March 10, 1959
H. B. KIRK ET AL
2,876,806
BEVERAGE DISPENSING MACHINE
Filed July 14, 1955
5 Sheets-Sheet 4
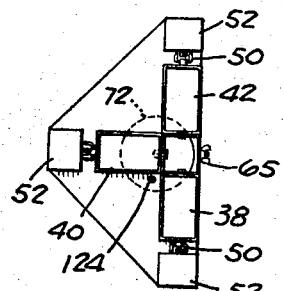
Fig. 4
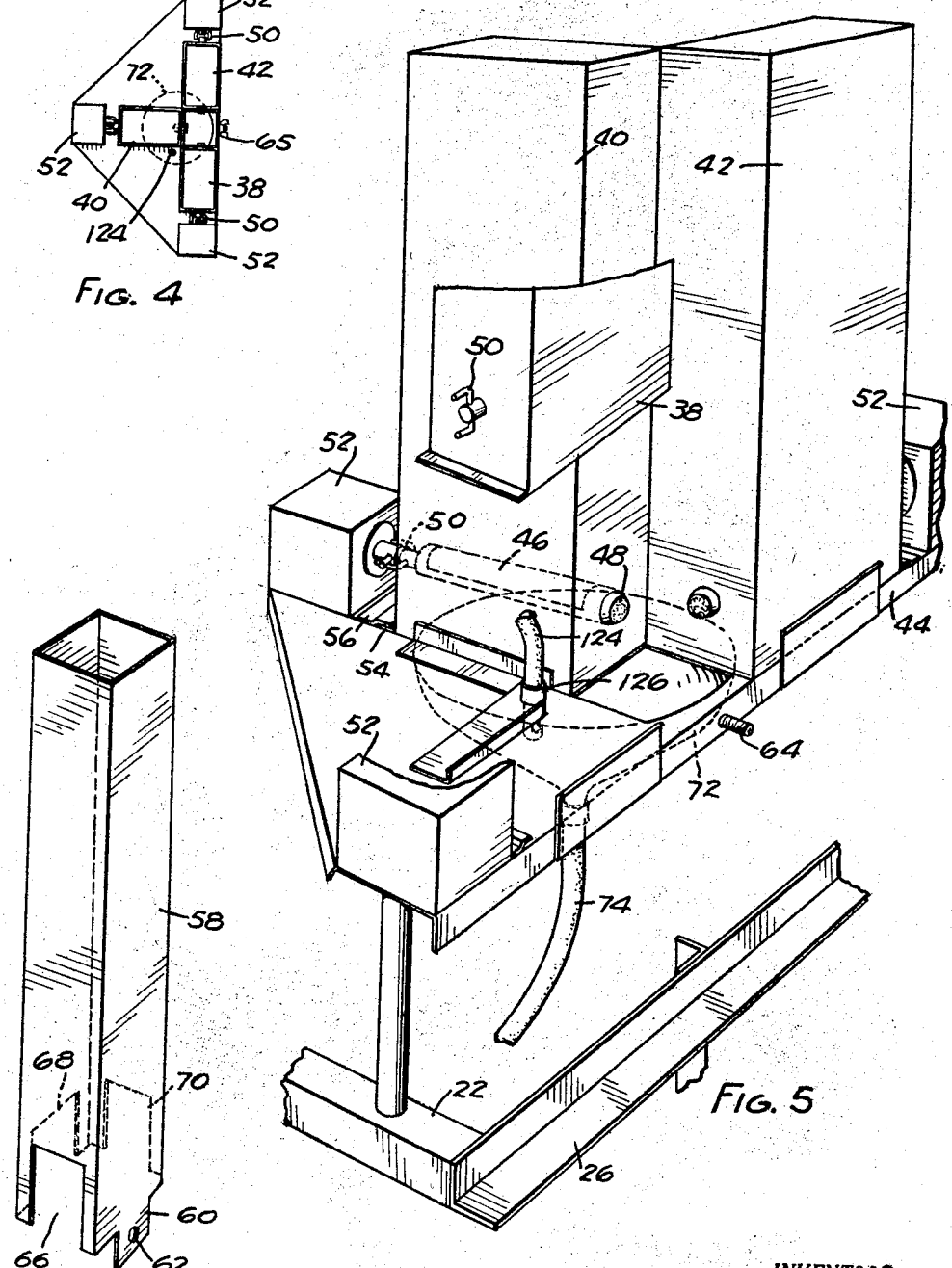
Fig. 5
Fig. 6
INVENTORS
HOWARD B. KIRK &
CHARLES F. ANSPACH
BY
ATTORNEYS.

March 10, 1959 H. B. KIRK ET AL 2,876,806
BEVERAGE DISPENSING MACHINE
Filed July 14, 1955 5 Sheets-Sheet 5
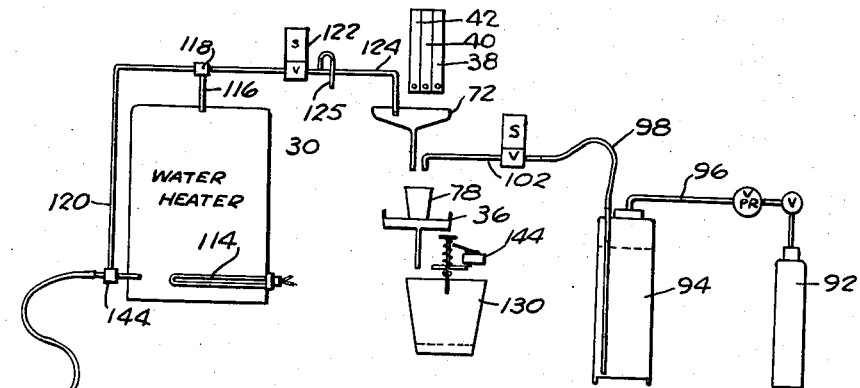
FIG. 7
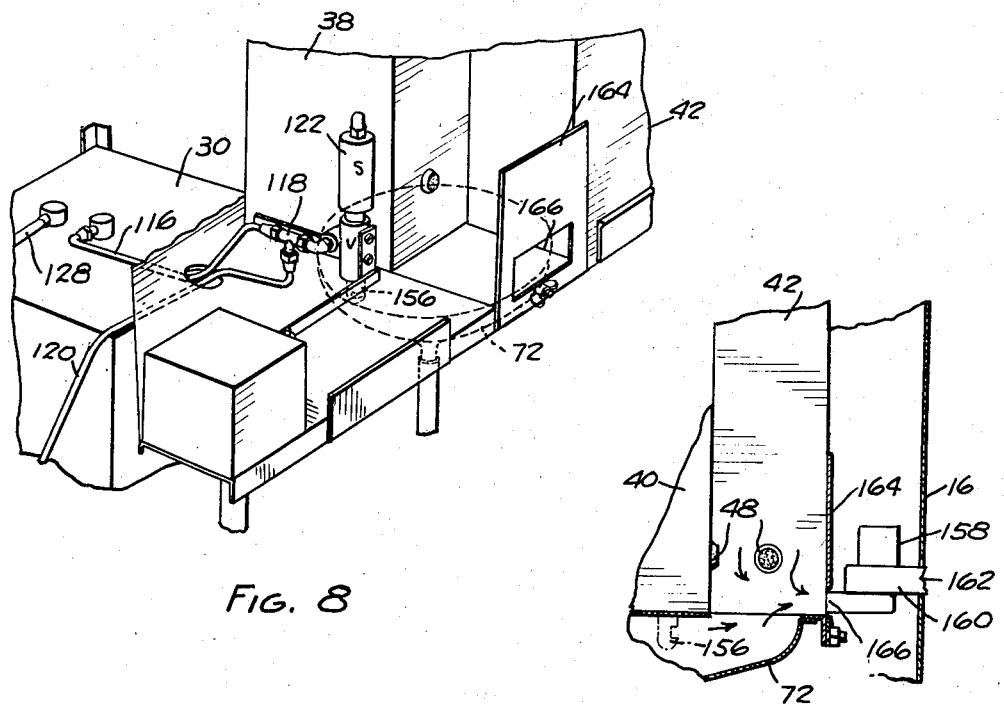
FIG. 8
FIG. 9
INVENTORS
HOWARD B. KIRK &
CHARLES F. ANSPACH
BY
Barnes, Kisselle, Laughlin & Raisch
ATTORNEYS.

United States Patent Office 2,876,806
Patented Mar. 10, 1959

2,876,806

BEVERAGE DISPENSING MACHINE

Howard B. Kirk and Charles F. Anspach, Detroit, Mich.

Application July 14, 1955, Serial No. 522,013

7 Claims. (Cl. 141—105)

This invention relates to a beverage dispensing machine and more particularly to a coin operated machine for vending coffee and another hot beverage, such as hot chocolate.

It is an object of this invention to provide a machine of the above type which is designed to facilitate servicing of the machine and to facilitate the cleaning thereof.

A further object of the invention is to provide a machine of the type described which is adapted to dispense both coffee and hot chocolate without contaminating either of these drinks with the taste of the other.

A further object of the invention is to provide a dispensing machine of the type described that is designed so that the path of travel of the hot water from the hot water tank to the cup positioned to receive the beverage is of a minimum length, whereby the temperature drop of the hot water is maintained at a minimum.

In the drawings:

Fig. 4 is a top plan view of a detail of the machine showing the arrangement of the coffee, cream and sugar containers.

Fig. 5 is a fragmentary perspective view on an enlarged scale of the ingredient containers and the mixing bowl.

Fig. 6 is a perspective view of the air vent tube.

Fig. 7 is a generally schematic view of the fluid and ingredient system of the machine.

Fig 8 is a view similar to Fig. 5 showing a modified form of construction.

Fig. 9 is a fragmentary sectional view showing the modified form of vent construction.

Figure 1:
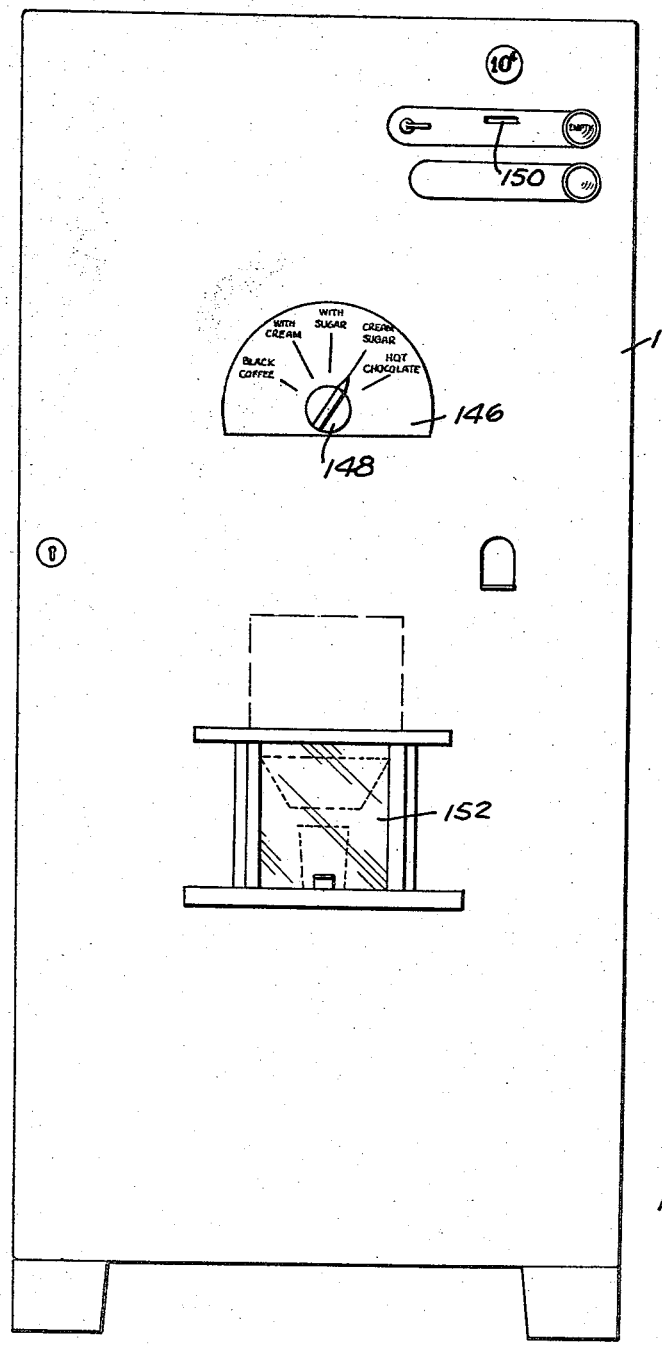
Fig. 1 is a front elevation of the machine with the cabinet door closed.
Figure 2:
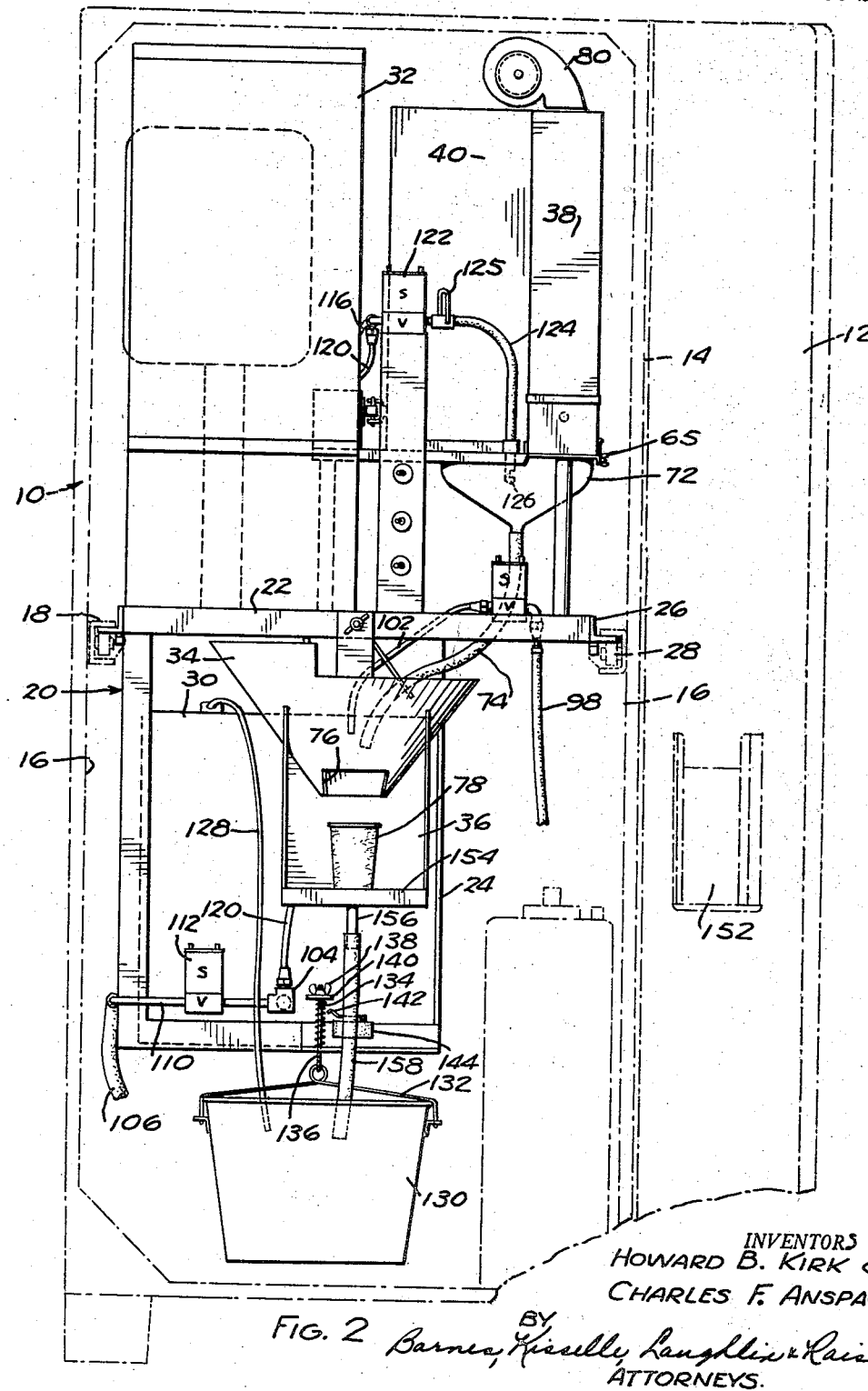
Fig. 2 is a front elevation of the machine with the cabinet door open.
Figure 3:
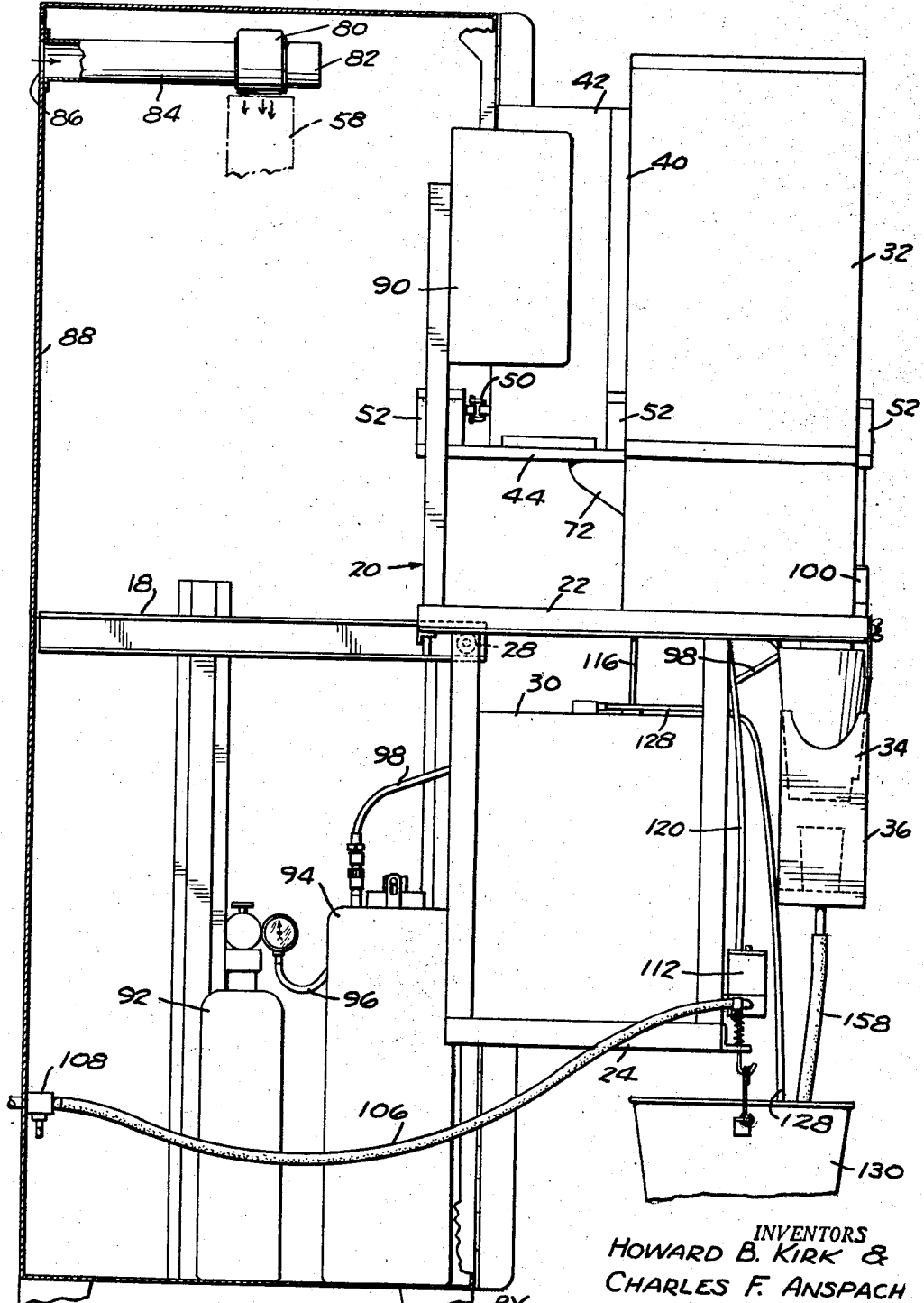
Fig. 3 is a vertical sectional view of the machine with the sliding rack which supports a portion of the dispensing mechanism in the outwardly extending position.

Referring particularly to Figs. 1 through 3, the machine generally includes an upright sheet metal cabinet 10 having a door 12 at the front face thereof which is hinged to open about the vertical side edge 14 of the cabinet. Within the cabinet, there is arranged on each of the side walls 16 a generally horizontal, channel-shaped track 18. A rack generally designated 20 is supported on tracks 18 for rolling movement out of and into cabinet 10 when the door 12 is open. Rack 20 includes a rectangular, horizontal frame section 22 and an undercarriage 24. The side members of frame 22 comprise angle irons 26 which are guided on rollers 28 mounted on the tracks 18. Undercarriage 24 supports a hot water tank 30. At the front of frame 22 and adjacent one side thereof, there is arranged a cup dispenser 32. Cups are arranged to be dispensed from dispenser 32 into a funnel-shaped delivery chute 34 and from chute 34 in an upright position onto a cup support receptacle 36.

On the opposite side of frame 22 are arranged the dry ingredient containers 38, 40 and 42. These containers are supported on an auxiliary platform 44 (Fig. 5), and each of the containers is in the form of a rectangular upright receptacle. The three containers are arranged perpendicular to one another so that they are disposed in a radially arranged fashion as shown in Fig. 4. Containers 38 and 42 are disposed in opposed relation adjacent the side wall 16 of the cabinet, and the container 40 is arranged perpendicular thereto between the opposing faces of containers 42 and 38. Within each container, there is arranged a material feed mechanism such as an auger 46. Auger 46 is arranged to feed material through a discharge opening 48 adjacent the lower end of each container, and each auger projects through the opposite face of the container and is provided with a coupling member 50 detachably connected to an electric feed motor 52. The couplings 50 are in the nature of forked members designed so that the respective containers can be shifted horizontally in the direction of the discharge openings 48 to disengage the respective motor 52 and thus disengage a flange 54 on the bottom face of each container with the retaining bracket 56 on auxiliary platform 44. The container can then be lifted off the auxiliary platform 44 for servicing, cleaning and the like.

Within the vertical channel formed by the adjacent end faces of containers 38 and 40 and 42, there is arranged a vent tube 58. Tube 58 is open at its opposite ends, and one side thereof is provided with a depending lug 60 having an aperture 62 therein which is adapted to engage with a threaded stud 64 on auxiliary platform 44 for holding the vent tube in position as by a wing nut 65. Adjacent its lower end, the vent tube is provided with openings 66, 68 and 70 which register with the discharge openings 48 of the containers 38, 40 and 42.

Below the lower open end of vent tube 58, there is arranged a mixing bowl 72 which is generally funnel-shaped and has connected to its outlet a conduit 74 which extends into chute 34 and terminates above and in registry with the outlet opening 76 of chute 34 so that the beverage discharged into the mixing bowl 72 flows through conduit 74 and is discharged into a cup 78 which has been dispensed from the mechanism 32 through the delivery chute 34 to the cup supporting receptacle 36.

A blower 80 provided with a motor 82 is supported within the cabinet so as to be positioned directly above the open upper end of vent tube 58 when the rack 20 is arranged in its retracted position in cabinet 12. Blower 80 is connected by an air tube 84 with an air inlet opening 86 in the back wall 88 of the cabinet.

Referring now to Fig. 3, it will be noted that a cycle switch box 90 is supported on rack 20 behind cup dispenser 32. Also, within the cabinet itself, and at one side of undercarriage 24, there is arranged an air pressure tank 92 and a syrup tank 94. A conduit 96 connects tank 92 with tank 94 so that syrup, chocolate syrup, for example, in tank 94 will be subjected to a constant pressure. The outlet of tank 94 has a flexible conduit 98 connected thereto. Conduit 98 connects with the inlet of solenoid valve 100, the outlet of which is provided with a conduit 102. It will be observed that the free end portion of conduit 102 extends generally vertically downwardly above and at one side of the free end of conduit 74. Furthermore, these conduits are arranged so that the syrup flowing through conduit 102 is discharged into the stream of the liquid flowing through conduit 74.

Hot water tank 30 has a T-fitting 104 at the lower front face thereof. A flexible conduit 106 at one end connects with a source of cold water through the rear wall 88 of cabinet 10 as at 108. The other end of flexible conduit 106 connects with a conduit 110 which is in turn connected through a solenoid valve 112 with T-fitting 104. The electrical leads from the solenoid valve 112 are in circuit with a fusible member, not shown, in hot water tank 30; and when the temperature of the water in tank 30 exceeds a predetermined maximum, the circuit through solenoid valve 112 is broken, thus closing the valve and shutting off the further supply of cold water to the tank. Suitable means, such as an electrical heating element 114 in Fig. 7, are employed for heating the water in tank 30.

From the upper end of water tank 30, there extends a hot water line 116 which connects with one side of a T-fitting 118. A water circulating line 120 extends between fittings 118 and 104. The other side of T-fitting 118 connects with a solenoid valve 122. Valve 122 has a hot water outlet line 124 connected thereto through a vent 125. Line 124 extends downwardly; and at its free end, it is provided with a nozzle 126 which is arranged to discharge hot water into mixing bowl 72 with a swirling action around the wall of bowl 72.

In addition to the safety shut-off valve 112, the hot water tank is provided with a pressure relief line 128 which discharges into a bucket 130. Bucket 130 has a bail 132 supported on undercarriage 24 by a spring 134 which surrounds a threaded rod 136 having a wing nut 138 at its upper end. Between wing nut 138 and the upper end of spring 134, there is arranged a relatively large washer 140. When the bucket 130 fills with liquid to a predetermined level, spring 134 is depressed and washer 140 engages the arm 142 of a switch 144 to shut off the supply of cold water through valve 112.

The electrical mechanism by which the vending operation is accomplished includes a selector switch 146 having a knob 148 which is rotatably adjustable to a plurality of indicated positions for determining the nature of the beverage to be dispensed; that is, whether the beverage dispensed is coffee or hot chocolate, and, in the case of coffee, with or without cream and/or with or without sugar. The electrical mechanism is energized by inserting a coin into the coin slot 150 of a coin-operated mechanism mounted on the inner face of door 12. The selector switch 146 is also mounted on the inner face of door 12.

The construction of the coin-operated mechanism and the selector switch 146, as well as the cycle switch in switch box 90, are conventional and need not be described. It is suffice to say that when a coin is inserted in the coin slot 150 after knob 148 is rotated to the selected position, the operation of the machine is automatic. The cycle switch mechanism in switch box 90 actuates for a predetermined interval of time the solenoid 122 and one or more of the motors 52 or solenoid valve 100 that are selected to be actuated by selector switch 146. In each instance, however, solenoid valve 122 is opened prior to the energizing of the feed motors 52 or solenoid valve 100 and is deenergized subsequent to the deenergizing of these motors or the chocolate syrup valve 100.

To illustrate the operation of the machine, let us assume that it is desired to dispense a cup of coffee with sugar and cream. In this event, knob 148 is rotated to a position indicated on the front panel of switch 146 where sugar and cream is indicated. A coin is then inserted in the coin slot 150. As pointed out previously, the coin closes a circuit through the electrical apparatus. The cup dispensing mechanism 32 is thus actuated to drop a cup 78 in delivery chute 34 and the cup is directed in an upright position into receptacle 36. Thereafter, solenoid valve 122 is energized to start the flow of hot water from the tank 30 through conduit 124 into the mixing bowl 72 with a swirling action. Shortly after the hot water starts to flow into mixing bowl 72, the feed motors 52 of receptacles 38, 40 and 42 are energized. One of these receptacles, 38, for example, contains powdered coffee; another, 40, for example, contains sugar; and the other, 42, for example, contains powdered cream. The cycle switch in switch box 90 energizes each of these motors for a predetermined length of time so as to dispense the proper amount of coffee powder, cream and sugar. These powdered materials are discharged from the receptacles through the discharge openings 48; and as they fall into the mixing bowl 72, they are picked up by the swirling hot water from nozzle 126 and caused to flow with hot water down through conduit 74 and into cup 78. Subsequent to the stopping of the feed motors 52, valve 122 closes and thus stops the flow of hot water. However, since the hot water flows subsequent to the deenergizing of the feed motors 52, the mixing bowl 72 is washed clean of sugar, cream and coffee powder. Thus, if the subsequent drink dispensed is black coffee, it will not be contaminated with the sugar or cream dispensed for the previous drink.

It should be pointed out at this time that the dropping of a coin in coin slot 150 also energizes motor 82 so that a stream of air is directed downwardly through vent tube 58 past the discharge openings 48 and into mixing bowl 72. This stream of air prevents steam or warm moist air from rising upwardly in tube 58 past the discharge openings 48 which would otherwise solidify the powdered materials at the openings and eventually clog the openings.

If, on the other hand, it is desired to vend a cup of hot chocolate, the selector knob 148 is rotated to the proper position; and in this case, when a coin is inserted into the coin slot 150, the hot water valve 122 is opened and thereafter, the chocolate syrup valve 100 is energized to discharge through the conduit 102 a predetermined amount of chocolate syrup. It will be observed, as pointed out previously, that the free end portion of conduit 102 extends generally vertically downwardly. We have found that with the conduit 102 arranged in this manner, a sharp cut off of the syrup flow in conduit 102 is obtained without positioning valve 100 directly adjacent the end of conduit 102. Also, the free ends of conduits 102 and 74 are related in position so that the chocolate syrup is discharged into the stream of hot water discharging from conduit 74. This produces an intimate mixing of the chocolate syrup with the hot water as it fills the cup 78. In the case of dispensing hot chocolate, it is preferred to have the chocolate syrup line 102 bypass the mixing bowl 72 and discharge directly into the stream of hot water because chocolate syrup has a very strong taste; and if it were discharged into mixing bowl 72 and caused to flow with the hot water through conduit 74, there is a strong likelihood that the subsequent drink, if other than hot chocolate, would be contaminated with the strong taste of the hot chocolate. After the selected drink is dispensed in the cup 78, the customer simply lifts a transparent panel 152 on door 12 to render the cup accessible.

The cup support 36 is provided with a perforated bottom 154 having a drain 156 which connects with the conduit 158. Conduit 158 discharges into bucket 130. With this arrangement, if any of the liquid should spill in the cup support 36, it will be directed to bucket 130; and when the liquid level in bucket 130 reaches a predetermined height, the machine will become inoperative because the flow of cold water will be shut off at the valve 112.

In machines of this type, cleanliness is of the utmost importance; and for this reason, it is necessary to arrange the various components so that they are readily accessible or removable to facilitate cleaning and servicing of the machine. Thus, the utility of the roll-out rack 20 will be readily appreciated. It will be noted, however, that the hot water tank 30 is mounted to move with the mixing bowl 72. Thus, the hot water line need not have any slack in it; and the hot water line from the tank 30 to the mixing bowl 72 can be maintained at a minimum length. In the present arrangement, the only conduits that are provided with slack are the chocolate syrup line 98 and the cold water line 106. Each of these two lines has sufficient slack to enable the mechanism on rack 20 to be pulled out of the cabinet 10 to the position shown in Fig. 3.

The cup-dispensing mechanism 32 is designed to be readily removable from the frame 22; and likewise, receptacles 38, 40 and 42 are arranged to be readily removed from the auxiliary platform 44. Thus, all portions of the machine are rendered readily accessible for cleaning and servicing.

In Figs. 8 and 9, a modified form of construction is shown. In this arrangement, the solenoid valve 122 is located directly above and closely adjacent the mixing bowl 72. The lower end of valve 122 is provided with a nozzle 156 which extends directly into mixing bowl 72. Nozzle 156 is positioned so that the water discharged therefrom swirls around the wall of bowl 72 and thus prevents the dry materials discharged from the outlets 48 of the receptacles from contacting a dry surface on the bowl 72. By positioning valve 122 closely adjacent mixing bowl 72 and maintaining the distance between the mixing bowl 72 and the delivery chute 34 relatively closely spaced, the distance through which the hot water has to travel through the hot water tank to the cup being filled is maintained at a minimum; and thus, the drop in temperature of the water, especially between successive dispensing operations, is likewise maintained at a minimum.

In Figs. 8 and 9, there is also illustrated a modified form of vent construction. In this arrangement, the motor blower unit 158 is mounted on the side wall 16 of the cabinet and has an air duct 160 connected therewith which vents through an air outlet opening 162 in the side wall of the cabinet. Auxiliary platform 44 has a baffle plate 164 mounted thereon at the open side of the vertical channel formed by the receptacles 38, 40 and 42. Baffle 164 is positioned at a level such that its lower edge is disposed below the discharge openings 48 and its upper edge is disposed at a level above these openings. Thus, when the motor blower unit 158 is in operation, air is caused to flow upwardly from a mixing bowl 72 and downwardly through the channel formed by the adjacent faces of the receptacles through the opening 166 to air duct 160 and out through the side of the cabinet through the opening 162. The air duct 160, together with the motor blower unit 158, is located on the side wall 16 of the cabinet in a position such as to register with opening 166 when the rack 20 is in the fully retracted position within the cabinet. In other respects, the arrangement shown in Figs. 8 and 9 is substantially the same as that shown in the previous figures described.

Thus, it will be seen that we have provided a beverage vending machine which is designed to facilitate servicing and cleaning of the machine. Furthermore, with the construction described herein, a very compact arrangement is provided; and at the same time, the length of the hot water line and thus, the distance through which the hot water has to travel in flowing from the hot water tank to the cup being filled is maintained at a minimum. Furthermore, the particular arrangement of the powdered ingredient receptacles enables them to be positioned compactly and to discharge directly into a relatively small mixing bowl. The arrangement of the discharge openings of these receptacles in combination with the positioning of the nozzle for directing hot water into the mixing bowl 72 insures a thorough mixing of the dry ingredients with the water and at the same time insures a thorough washing from the mixing bowl of the dry ingredients so that a subsequent drink will not be contaminated with the ingredients of the previous drink. In addition, the arrangement of a chocolate syrup line so as to bypass the mixing bowl and to discharge directly into the stream of hot water flowing into the cup enables the machine to be used for dispensing both coffee and hot chocolate without the problem of contaminating any of the lines utilized in the dispensing of coffee with the strong taste of the chocolate syrup.

We claim:

1. In a beverage dispensing machine, the combination of a cabinet open at one side and having a panel for closing said open side, means forming a track in said cabinet, a rack supported in said cabinet on said track for movement from a position within the cabinet to a position projecting out of the cabinet through said open side, a hot water tank on said rack, a flexible conduit for connecting said tank with a source of cold water, said flexible conduit having sufficient slack therein to permit the rack to be shifted out of said cabinet to said last mentioned position, a beverage ingredient dispensing mechanism on said rack, a mixing bowl carried by said rack and positioned to receive beverage ingredients from said dispensing mechanism and a hot water conduit extending substantially directly from said tank to said mixing bowl, whereby the drop in temperature of the hot water in flowing from said tank to said dispensing mechanism is maintained at a minimum.

2. In a beverage dispensing machine, the combination of a cabinet open at one side and having a panel for closing said open side, means forming a track in said cabinet, a rack supported in said cabinet on said track for movement from a position within the cabinet to a position projecting out of the cabinet through said open side, a hot water tank on said rack, a flexible conduit for connecting said tank with a source of cold water, said flexible conduit having sufficient slack therein to permit the rack to be shifted out of said cabinet to said last mentioned position, a plurality of beverage ingredient containers removably supported on said rack, said containers each having a discharge opening therein adjacent the lower end thereof, a mixing bowl on said rack positioned directly below said discharge opening and adjacent said hot water tank and a hot water conduit extending substantially directly from said tank to said mixing bowl, whereby the drop in temperature of the hot water in flowing from said tank to said mixing bowl is maintained at a minimum.

3. The combination set forth in claim 2 including a cup support positioned at a level below said mixing bowl and an outlet conduit extending from said mixing bowl to said cup support.

4. In a beverage dispensing machine, the combination of a cabinet open at one side and having a panel for closing said open side, means forming a track in said cabinet, a rack supported in said cabinet on said track for movement from a position within the cabinet to a position projecting out of the cabinet through said open side, a hot water tank on said rack, a flexible conduit for connecting said tank with a source of cold water, a mixing bowl on said rack, a cup support on said rack for receiving a cup to be filled with beverage, said mixing bowl having an outlet, a delivery conduit extending from said hot water tank to said mixing bowl and a plurality of beverage ingredient containers removably positioned on said rack, said containers each having a discharge opening positioned directly above said mixing bowl.

5. The combination set forth in claim 4 including a cup dispensing mechanism on said rack arranged, when actuated, to deliver a cup in an upright position to said cup support.

6. In a beverage dispensing machine, the combination of a cabinet open at one side and having a panel for closing said open side, means forming a track in said cabinet, a rack supported in said cabinet on said track for movement from a position within the cabinet to a position projecting out of the cabinet through said open side, a hot water tank carried by said rack, a flexible conduit for connecting said tank with a source of cold water, a plurality of beverage ingredient containers supported on said rack and each having a discharge opening, a mixing bowl carried by said rack and located to receive beverage ingredients from the discharge openings of said containers, and a delivery conduit extending from said hot water tank to said mixing bowl.

7. The combination called for in claim 6 wherein the mixing bowl is provided with an outlet at the lower end thereof, said delivery conduit having its delivery end positioned to direct a stream of hot water to said mixing bowl in a direction tangentially of and offset from said outlet whereby the water issuing from said delivery conduit tends to wash out said mixing bowl.

References Cited in the file of this patent

UNITED STATES PATENTS

| | | |
|---|---|---|
| 2,536,400 | Thompson | Jan. 2, 1951 |
| 2,614,738 | Mills | Oct. 21, 1952 |
| 2,621,838 | Price | Dec. 16, 1952 |
| 2,682,984 | Melikian et al. | July 6, 1954 |